Jan. 7, 1936. H. E. WURZBACH ET AL Re. 19,817

ELECTROMAGNETIC VIBRATING APPARATUS

Original Filed July 1, 1932 2 Sheets-Sheet 1

INVENTORS:
Hugh E. Wurzbach,
Clyde H. Konold,
BY Arthur P. Knight and
Alfred C. Knight
ATTORNEYS.

Jan. 7, 1936. H. E. WURZBACH ET AL Re. 19,817
ELECTROMAGNETIC VIBRATING APPARATUS
Original Filed July 1, 1932 2 Sheets-Sheet 2
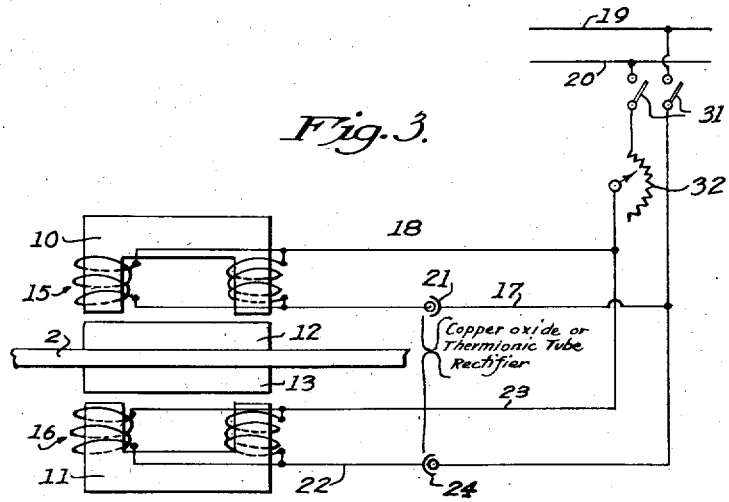
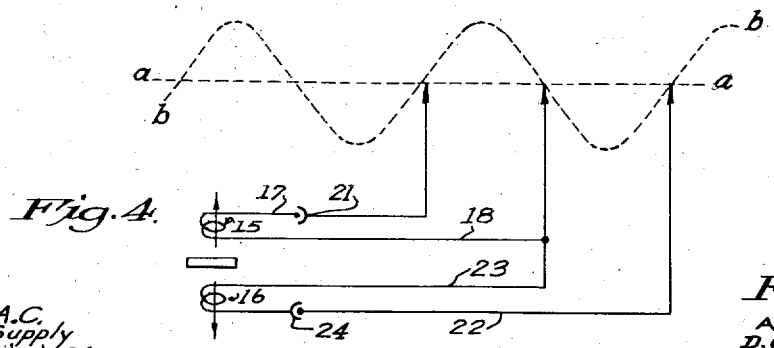
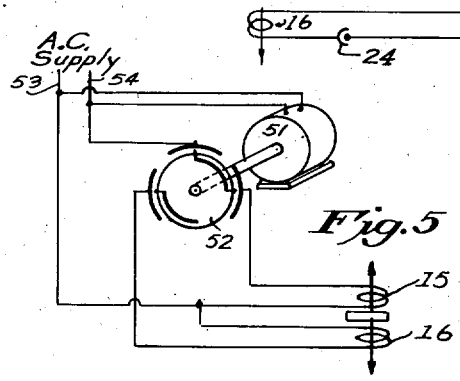
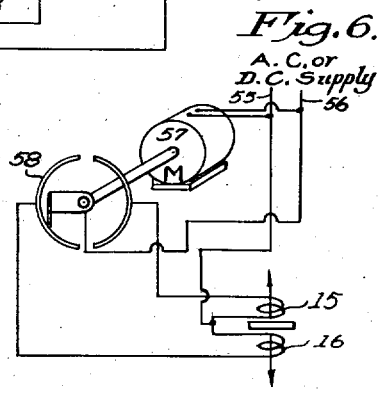
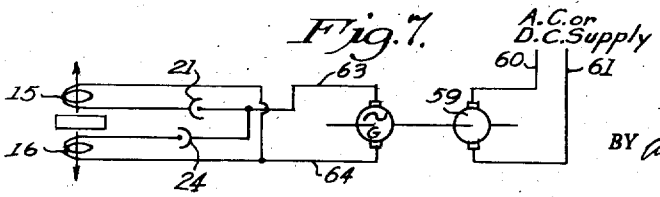
INVENTORS:
Hugh E. Wurzbach,
Clyde H. Konold,
BY Arthur P. Knight and Alfred W. Knight
ATTORNEYS.

Reissued Jan. 7, 1936 Re. 19,817

UNITED STATES PATENT OFFICE 19,817

ELECTROMAGNETIC VIBRATING APPARATUS

Hugh E. Wurzbach and Clyde H. Konold,
Magna, Utah

Original No. 1,945,015, dated January 30, 1934, Serial No. 620,340, July 1, 1932. Reissue No. 19,816, dated January 7, 1936, Serial No. 29,366, July 1, 1935. Divided and this application for reissue October 7, 1935, Serial No. 43,992

2 Claims. (Cl. 172—126)

This invention relates to an improvement in electrically operated vibrating apparatus adapted for use in operating various vibrating devices such as screens, grizzlies, feeders, conveyors, froth breakers, etc.

The main object of the invention is to provide means for operating a vibrating device by positive electromagnetic action in both directions of the vibrating movement thereby obtaining a more effective and positive action than is possible where the vibrating movement in one direction is effected by electromagnetic means and the movement in the opposite direction is effected by resilient means operating in opposition to the electromagnetic means.

A further object of the invention is to obtain economies in construction and operation by dispensing with resilient return means operating in opposition to the electromagnetic operating means.

A further object of the invention is to provide for electromagnetic operation of vibrating devices by any electrical power system without the aid of special frequency changers, motor generator sets or rotary convertors for changing the voltage, frequency or shape of the current wave in the supply circuit.

The apparatus comprises electromagnetic operating means including one or more electromagnetic units each of which comprises two electromagnetic devices operating in opposite directions upon the operated member or means, and circuit connections for alternately energizing said electromagnetic devices. According to a preferred embodiment of the invention, means are provided for energizing said devices from an alternating current circuit, in such manner that the respective electromagnetic devices of each operating unit are energized alternately by alternate half waves of the alternating current. For this purpose suitable rectifying means are included in the connections from the alternating current circuit to the respective electromagnetic devices in such manner that half waves in one direction are conducted to one electromagnetic device and the half waves in the opposite direction are conducted to the other electromagnetic device, so that the said two electromagnetic devices operate alternately on suitable armature means connected to the operated members to effect positive vibration thereof. The operated member is preferably resiliently supported to enable it to take up the vibrations imparted thereto by the said electromagnetic means.

Electromagnetically operated vibratory devices have been made in which electromagnets are used to attract armatures attached to the operated vibrating member which is supported on resilient means but such devices have heretofore depended on the use of strong resilient devices such as steel bars or coil springs which give a kick or vibration to the operated member when released by the electromagnets so that, for example, the electromagnets provide the power for the stroke in one direction and the springs provide the power for the stroke in the opposite direction. These resilient devices or springs must be strong and stiff so as to cause the operated member to have a quick snap when released from the electromagnets and therefore the power required to deflect them is higher than is necessary if both directions of movement are effected by electromagnetic power. With our apparatus the resilient support for the operated means is not depended upon to effect the return movement of said means and a relatively light resilient supporting means may therefore be used.

Yielding or resilient stop members, such as rubber bumpers, are also preferably provided for limiting the movement of the operated member in each direction by the respective electromagnetic devices.

The accompanying drawings illustrate the invention and referring thereto:

Fig. 3 is a diagram showing the electrical operating connections for the electromagnetic vibrating means;

Fig. 4 is a graph of an alternating current wave illustrating the selection of rectified half waves for distribution to the respective members of the electromagnetic vibrating unit;

Fig. 5 is a diagrammatic showing of a mechanical rectifying apparatus which may be used for alternate energization of the respective electromagnetic units;

Fig. 6 is a diagrammatic showing of an alternative mechanical rectifier arrangement which may be used for alternate energization of the respective electromagnetic units from an A. C. or D. C. energy supply;

Fig. 7 is a diagrammatic showing of a motor-generator arrangement whereby any desired frequency of alternate energization of the electromagnetic units may be obtained.

Figure 1:
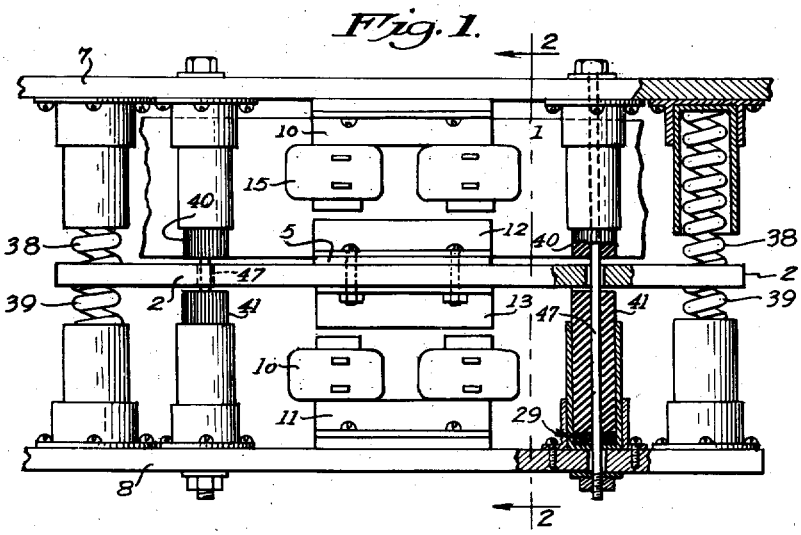
Fig. 1 is a side elevation of the electromagnetic vibrating means.
Figure 2:
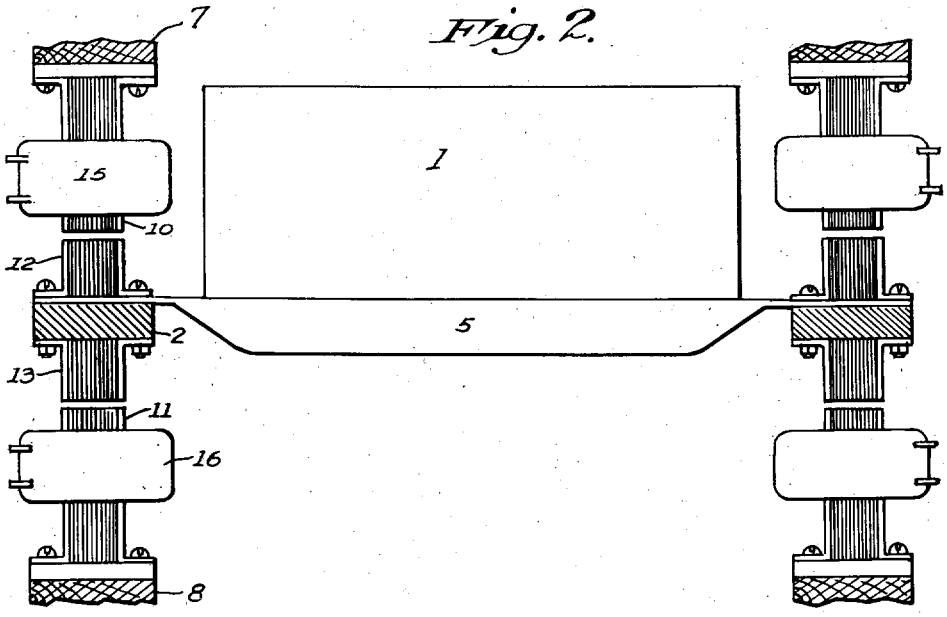
Fig. 2 is a section on line 2—2 in Fig. 1.

Our invention may be applied to operation of any vibrating means such as a screen, conveyor, feed box et cetera. The operated vibrating means indicated at 1 in Figs. 1 and 2 is shown as resiliently mounted on a supporting means or frame, for example, by means of two parallel elongated rigid vibratory members 2, such as bars of steel or other suitable material, disposed at the respective sides of the supporting frame, resiliently mounted on supports 7 and 8 in any suitable manner, for resilient vibratory movement in a direction transverse to the length thereof. The bars 2 are shown connected to the operated vibrating means 1 by a cross bar 5. It will be understood that the member 1 may be mounted to vibrate in vertical, inclined or horizontal directions, according to the specific application of the same.

The resilient supporting means may comprise springs 38 and 39 mounted on the supports 7 and 8 at opposite sides of the central portion of said bars 2 and resiliently engaging said bars. Rubber stops or bumpers 40 and 41 may be provided if desired, positioned on the frame members 7 and 8 to engage the vibratory members 2 at opposite sides thereof in the direction of vibration thereof at positions longitudinally removed from the armature means of the electromagnetic operating means hereinafter described, so as to limit the vibratory movement of said members and the member 1 carried thereby. If desired, the supporting springs 38 and 39 may be omitted and the rubber bumpers 40 and 41 may be adjusted to normally engage the vibratory members 2 and to resiliently support the same while at the same time limiting their vibratory movement by reason of the limited compressibility of the rubber members. Any suitable means may be provided for securing the vibratory members 2 against lateral or longitudinal displacement in a direction perpendicular to the direction of vibratory movement thereof, while permitting such vibratory movement. For this purpose, positioning members such as rods 47 may be provided extending slidably through the members 2 and secured to the supporting frame members 7 and 8. Said positioning members may extend centrally within the bumper members 40 and 41, as shown, or within the springs 38 and 39, or at any other suitable positions.

The electromagnetic operating means for the member 1 are shown mounted on the supports 7 and 8 and may comprise an electromagnetic unit at each side of the device, each unit comprising an electromagnet 10 mounted on the support 7, an electromagnet 11 mounted on support 8, and separate armature means 12 and 13 for the respective electromagnets, secured to the intermediate portion of the vibratory bars 2 at the corresponding side of the member 1 or otherwise connected to said member 1 to impart vibration thereto, the armature means 12 and 13 of each unit being mounted at the opposite sides of the corresponding bar in the plane of vibration thereof. The core members and armatures for the respective electromagnets are preferably made of laminated soft iron to enable them to operate on rapidly intermittent current without objectionable lag or production of eddy currents. The armatures, being of soft iron, except for the momentary polarization due to the influence of the associated electromagnets, are not magnetically polarized, and are not provided with electric windings or coils for self-energization or self-polarization. The term "armature" as used herein and in the appended claims, will be understood to mean a non-polarized, non-energized armature of this type. The respective electromagnets 10 and 11 of each unit and their armature means 12 and 13 are so disposed as to cause the respective armatures to be attracted in opposite directions upon energization of the respective electromagnets. For this purpose, each armature 12 is shown as mounted above or at one side of the corresponding vibratory member 2, and the electromagnet 10 therefor is mounted above or at the same side of said armature so as to attract the same upwardly or in a direction toward said one side, while each armature 13 is mounted below or at the other side of said member 2, and the corresponding electromagnet 11 is mounted below or at the other side of said armature so as to attract the same downwardly or in a direction toward said other side.

In Fig. 3, there is shown a wiring diagram for the electromagnetic unit at one side of the device only, it being understood that the other electromagnetic unit may be similarly connected.

The coils or windings 15 of electromagnet 10 are connected by electrical connections 17 and 18 to alternating current supply lines 19 and 20 which may be ordinary service lines of usual commercial frequency. One of these connections, for example connection 17, includes a suitable rectifying means or electric check valve 21, such as a copper oxide or thermionic tube rectifier, which operates to permit passage of a current impulse or half wave in one direction but to prevent the passage of a current impulse or half wave in the opposite direction. The windings or coils 16 of electromagnet 11 are also shown as connected to the same service lines 19 and 20 by electrical connections 22 and 23 one of which includes a rectifying means 24 which is adapted to permit passage of current impulses or half waves which are in opposite direction to the impulses transmitted through the rectifying means 21. The operation of these rectifying units 21 and 24 is illustrated diagrammatically in Fig. 4 wherein the curve *b—b* is the graph of an alternating current, the positive half waves being shown above the horizontal line *a—a*, representing zero current, and the negative half waves below that line in the usual manner, and the positive half waves being transmitted through connections 17 and 18 and rectifier 21 to the coil 15 whereas the negative half waves are transmitted through connections 22 and 23 and rectifier 24 to the coil 16.

The rectifiers 21 and 24 may be of any suitable type. We have used the so-called copper-oxide rectifiers in practical operation with successful results.

The bumpers or stops 40 and 41 may be adjusted, if necessary, by suitable means such as shown at 29. The main function of these bumpers or stops is to limit or stop the travel of the armatures in either direction before they strike the magnet pole pieces in order to prevent injury to the laminations. These stops or bumpers also tend to impart accelerating impulses to the armatures or vibrating members when released by the diminution of current in the energizing coils 15 or 16, as the case may be. The stops or bumpers 40 and 41 may be of rubber or any other suitable yielding or resilient material, and may if desired be dispensed with, but in that case the resilient supporting means 38 and 39 must be made heavier, with the result that the construction is less resilient and will give correspondingly less vibration per unit of power. The stops may be normally in contact with the vibratory members 2, or they may be slightly spaced from the same, as may be desired.

The energizing circuit may be a single phase alternating current supply circuit of any suitable or available frequency, for example 25 to 60 cycles per second, these being the frequencies ordinarily used in commercial lines. Suitable switch means 31 will be provided controlling connection between the energizing circuit and the electromagnetic means above described; also suitable adjustable resistances 32, or impedances, autotransformers or other devices may be included in the circuit connections for controlling or regulating the intensity of the current supply, to correspondingly control or regulate the operation of the apparatus.

In the operation of the apparatus the current supplied to the electromagnetic devices from the supply lines 19 and 20 is controlled by the rectifiers 21 and 24 in such manner that the positive impulses or half waves of current will be allowed to pass through rectifier 21 to the winding 15 but will be prevented by rectifier 24 from passing through rectifier 21 to coil 16; whereas the negative impulses or half waves alternating with the positive impulses or half waves will be permitted to pass through rectifier 24 to coil 16 but will be prevented by rectifier 21 from passing to coil 15. As the positive or negative impulses or half waves successively alternate or succeed one another in the operation of the alternating current, the windings 15 and 16 alternately energize electromagnets 10 and 11 which operate upon the armatures 12 and 13 to produce the rapid reciprocation or vibration of the members 2 and of the member 1 connected thereto.

Any suitable means may be used for applying energizing current alternately to the two electromagnets of the operating units, for example, we can use instead of a copper-oxide rectifier any other form of electrical check valve such as a thermionic tube or electronic rectifier or a mechanical rectifier consisting of a rotating timer driven by a synchronous motor operated from the alternating current supply circuit; or if suitable alternating current power is not available, direct current can be used by passing it through a combination timer and interrupter so as to produce pulsating current and deliver the successive pulsations alternately, first to one set of coils and then to the opposite set of coils repeatedly.

While we prefer to connect the apparatus directly to an operating alternating current circuit as above described and to avoid the use of supplemental apparatus such as frequency changers, rotary convertors or other apparatus for varying the characteristics of the operating current, such apparatus may be used if desired, for example, for increasing the frequency of the operating current when it is desired to vibrate the mechanism at increased speed for short periods for any reason.

In Figs. 5 to 7 we have shown several modifications of the energizing circuit hook-up and referring particularly to Fig. 5, a half-speed synchronous motor 51 is shown operatively connected to a rotatable commutating switch 52 provided with suitable connection to alternating current energy supply lines 53 and 54 and arranged to deliver successive half-waves alternately to the respective electro-magnet windings 15 and 16.

The arrangement shown in Fig. 6 may be used either with a source of alternating current energy supply or a source of direct current energy supply, the energy supply lines being designated at 55 and 56. In case the supply lines 55 and 56 provide alternating current of the desired frequency, the motor 57 operating the switch means 58 may be a full-speed synchronous motor and this arrangement will provide for delivery of successive half-waves to the windings 15 and 16 in the same manner as described in connection with Fig. 5. If the supply lines 55 and 56 provide a source of direct current energy, the motor 57 may be of any suitable type, and will serve to periodically connect first one and then the other of the windings 15 and 16 to the source of energy.

In Fig. 7 we have shown an arrangement in which a motor 59 is connected to the supply lines 60 and 61 of either an A. C. or D. C. supply circuit, and operates to drive an alternator 62 whose leads 63 and 64 are connected to the windings 15 and 16 through the use of associated copper oxide or thermionic tube rectifiers 21 and 24 respectively, in the same manner as shown in Figs. 3 and 4. This arrangement is useful where the respective windings are to be energized at a frequency different from the frequency existing in the supply lines 60 and 61 or to utilize a direct current supply to drive an alternating current supply means, in which case the leads 63 and 64 become energy supply lines comparable to those shown at 19 and 20 in Fig. 3.

This application is a division of our co-pending application, Serial No. 29,366 for reissue of Patent No. 1,945,015.

We claim:

1. A vibratory apparatus comprising: a frame structure; an elongated rigid vibratory member resiliently disposed on said frame structure and adapted for vibratory motion in a direction transverse to the length thereof, said vibratory member being resiliently engaged by resilient supporting means secured to said frame structure at opposite sides of the central portion of said vibratory member; two separate non-polarized armature means mounted on the central portion of said member; a pair of electromagnets secured to said frame and operatively associated with the respective armature means and acting oppositely thereon in said direction of vibration; and means for alternately supplying unidirectional electrical energy to the respective electromagnets.

2. The invention set forth in claim 1, and comprising in addition: resilient stops positioned on said frame for engagement with said vibratory member at opposite sides of said member in the direction of vibration thereof at positions removed from said armature means longitudinally of said member.

HUGH E. WURZBACH.
CLYDE H. KONOLD.